(12) United States Patent
Li

(10) Patent No.: US 9,898,660 B2
(45) Date of Patent: *Feb. 20, 2018

(54) OBJECT DETECTION SYSTEM

(71) Applicant: Lockheed Martin Corporation, Bethesda, MD (US)

(72) Inventor: Bing Li, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,093

(22) Filed: Jun. 6, 2016

(65) Prior Publication Data
US 2016/0283775 A1    Sep. 29, 2016

Related U.S. Application Data

(63) Continuation of application No. 14/810,066, filed on Jul. 27, 2015, now Pat. No. 9,361,539, which is a
(Continued)

(51) Int. Cl.
*G06K 9/00* (2006.01)
*G06K 9/66* (2006.01)
(Continued)

(52) U.S. Cl.
CPC ......... *G06K 9/0063* (2013.01); *F41H 11/136* (2013.01); *G06K 9/00201* (2013.01);
(Continued)

(58) Field of Classification Search
CPC .... G06K 9/00201; G06K 9/66; G06K 9/6211; G06K 9/0063; G06K 9/4638;
(Continued)

(56) References Cited

U.S. PATENT DOCUMENTS 3,902,155 A   8/1975   Young
5,155,706 A   10/1992  Haley et al.
(Continued)

FOREIGN PATENT DOCUMENTS

WO   01/09823 A1   2/2001

OTHER PUBLICATIONS

European examination report dated Jun. 28, 2016, in European Application No. 13 805 204.8-1655, 5 pgs.
(Continued)

*Primary Examiner* — Samir Ahmed
(74) *Attorney, Agent, or Firm* — Miles & Stockbridge PC

(57) ABSTRACT

An airborne mine countermeasure system includes a processor coupled to a memory having stored therein software instructions that, when executed by the processor, cause the processor to perform a series of image processing operations. The operations include obtaining input image data from an external image sensor, and extracting a sequence of 2-D slices from the input image data. The operations also include performing a 3-D connected region analysis on the sequence of 2-D slices, and extracting 3-D invariant features in the image data. The operations further include performing coarse filtering, performing fine recognition and outputting an image processing result having an indication of the presence of any mines within the input image data.

20 Claims, 4 Drawing Sheets

Related U.S. Application Data continuation of application No. 13/419,931, filed on Mar. 14, 2012, now Pat. No. 9,092,866.

(51) Int. Cl.
| | |
|---|---|
| *F41H 11/136* | (2011.01) |
| *G06K 9/46* | (2006.01) |
| *G06K 9/62* | (2006.01) |
| *H04N 13/02* | (2006.01) |
| *G06T 5/00* | (2006.01) |
| *G06T 5/20* | (2006.01) |

(52) U.S. Cl.
CPC .......... *G06K 9/00208* (2013.01); *G06K 9/46* (2013.01); *G06K 9/4609* (2013.01); *G06K 9/4638* (2013.01); *G06K 9/6202* (2013.01); *G06K 9/6211* (2013.01); *G06K 9/6256* (2013.01); *G06K 9/66* (2013.01); *G06T 5/001* (2013.01); *G06T 5/20* (2013.01); *H04N 13/0239* (2013.01); *G06K 2209/09* (2013.01); *G06T 2207/10032* (2013.01); *G06T 2207/20024* (2013.01); *G06T 2207/30212* (2013.01)

(58) Field of Classification Search
CPC ............. G06K 2209/09; G06K 9/3241; G06K 9/00214; G06K 9/00288; G06T 5/20; G06T 2207/10032; G06T 2207/20024; H04N 13/0239
USPC ........ 382/103, 106, 154, 190, 203; 345/419, 345/422
See application file for complete search history.

(56) References Cited

U.S. PATENT DOCUMENTS

| | | | |
|---|---|---|---|
| 5,276,632 A | 1/1994 | Corwin et al. | |
| 5,446,529 A | 8/1995 | Stettner et al. | |
| 5,796,867 A | 8/1998 | Chen et al. | |
| 6,052,485 A | 4/2000 | Nelson et al. | |
| 6,069,842 A | 5/2000 | Peynaud et al. | |
| 6,466,159 B1 | 10/2002 | Rotgans | |
| 6,664,529 B2 | 12/2003 | Pack et al. | |
| 6,674,895 B2 | 1/2004 | Rafii et al. | |
| 6,963,354 B1 | 11/2005 | Scheps | |
| 7,391,907 B1 | 6/2008 | Venetianer et al. | |
| 7,542,624 B1 | 6/2009 | Koch | |
| 7,630,580 B1 | 12/2009 | Repenning | |
| 7,916,933 B2 | 3/2011 | Schwartz et al. | |
| 7,956,988 B1 | 6/2011 | Moran | |
| 8,958,661 B2 | 2/2015 | Panda et al. | |
| 9,092,866 B1 | 7/2015 | Li | |
| 9,361,539 B2* | 6/2016 | Li | F41H 11/136 |
| 2003/0108244 A1 | 6/2003 | Li et al. | |
| 2004/0027919 A1 | 2/2004 | Erikson | |
| 2004/0252864 A1 | 12/2004 | Chang et al. | |
| 2005/0007448 A1 | 1/2005 | Kaltenbacher et al. | |
| 2005/0099887 A1 | 5/2005 | Zimmerman et al. | |
| 2006/0008138 A1 | 1/2006 | Zhou et al. | |
| 2006/0240862 A1 | 10/2006 | Neven et al. | |
| 2007/0035624 A1 | 2/2007 | Lubard et al. | |
| 2008/0041264 A1 | 2/2008 | Fournier | |
| 2008/0175434 A1 | 7/2008 | Schwartz et al. | |
| 2009/0201763 A1 | 8/2009 | Jones et al. | |
| 2010/0074551 A1 | 3/2010 | Lin et al. | |
| 2012/0121130 A1 | 5/2012 | Kaminka et al. | |
| 2012/0314935 A1* | 12/2012 | Cheng | G06K 9/00671 382/154 |

OTHER PUBLICATIONS

Bing, C. Li, "Repeatedly Smoothing, Discrete Scale-Space Evolution, and Dominant Point Detection", Pattern Recognition, vol. 29, No. 1996, pp. 1049-1059.

Huttenlocher, Daniel P., Klanderman, Gregory A., and Rucklidge, William J., "Comparing Images Using the Hausdorff Distance", IEEE Transactions on Pattern Analysis and Machine Intelligence, 1993, pp. 850-863.

Felzenszwalb, Pedro F., "Learning Models for Object Recognition", IEEE Conference on Computer Vision and Pattern Recognition, 2001, pp. I-1056 to I-1062.

Felzenszwalb, Pedro F., "Representation and Detection of Shapes in Images", Phd Dissertation, MIT, 2003, pp. 1-83.

Bing, C. Li and Shen, Jun, "Range-Image-Based Calculation of Three-Dimensional Convex Object Moments", IEEE Trans. on Robotics and Automation, vol. 9, No. 4, 1993, pp. 485-490.

Sadjadi, Firooz and Hall, Ernest L., "Three-Dimensional Moment Invariants", IEEE Trans. on Pattern Analysis and Machine Intelligence, 2(2), Mar. 1980, pp. 127-136.

International Search Report and Written Opinion dated Dec. 5, 2013, in International Application No. PCT/US2013/031281.

Any information that are not included with this Information Disclosure Statement can be found in U.S. Appl. No. 13/419,931.

Supplementary European Search Report in EP 13805204 dated Jul. 10, 2015.

* cited by examiner

OBJECT DETECTION SYSTEM

Embodiments relate generally to mine detection and, more particularly, to airborne mine countermeasures.

Conventional approaches to underwater mine detection include using a matched filter to process 2-D image data. Conventional approaches can be subject to false positives, which can produce a larger subset of images that may require human review. Moreover, the 2-D matched filter approach can be sensitive to rotation and/or size changes, and also sensitive to interfering objects.

Embodiments were conceived in light of the above, problems and limitations of some conventional systems, among other things.

One or more embodiments include an airborne mine countermeasure system having it processor coupled to a memory having stored therein software instructions that, when executed by the processor, cause the processor to perform a series of image processing operations. The operations include obtaining input image data from an external image sensor, and extracting a sequence of 2-D slices from the input 3-D image data. The operations also include performing a 3-D connected region analysis on the sequence of 2-D slices, and determining 3-D invariant features in the image data. The operations further include performing coarse filtering, performing fine recognition, and outputting an image processing result having an indication of the presence of any mines within the input image data.

One or more embodiments can also include a computerized method for detecting underwater mines. The method can include obtaining, at a processor, input image data from an external image sensor, and extracting, using the processor, a sequence of 2-D slices from the input image data. The method can further include performing a 3-D connected region analysis on the sequence of 2-D slices, and determining 3-D invariant features in the image data. The method can also include performing coarse filtering, performing fine recognition, and outputting an image processing result having an indication of the presence of any mines within the input image data.

One or more embodiments can also include a nontransitory computer readable medium having stored thereon software instructions that, when executed by a processor, cause the processor to perform a series of operations. The operations can include obtaining, at a processor, input image data from an external image sensor, and extracting, using the processor, a sequence of 2-D slices from the input image data. The operations can further include performing a 3-D connected region analysis on the sequence of 2-D slices, determining 3-D invariant features in the image data. The operations can also include performing coarse filtering, performing fine recognition, and outputting a result baying an indication of the presence of any mine images within the input image data.

In one or more embodiments, the extracting can include using diffusion equations to generate a sequence of 2-D slices. In one or more embodiments, performing the connected region analysis includes analyzing, at the processor, volumetric pixel elements.

In one or more embodiments, performing the fine recognition includes applying a metric including the Hausdorff metric. In one or more embodiments, the extracting can include extracting different size objects through a series of filtering operations.

In one or more embodiments, operations can further include performing a coarse filtering operation. Also, the nontransitory computer readable medium can be configured to be executed by a processor onboard an aircraft.

DETAILED DESCRIPTION

Figure 1:
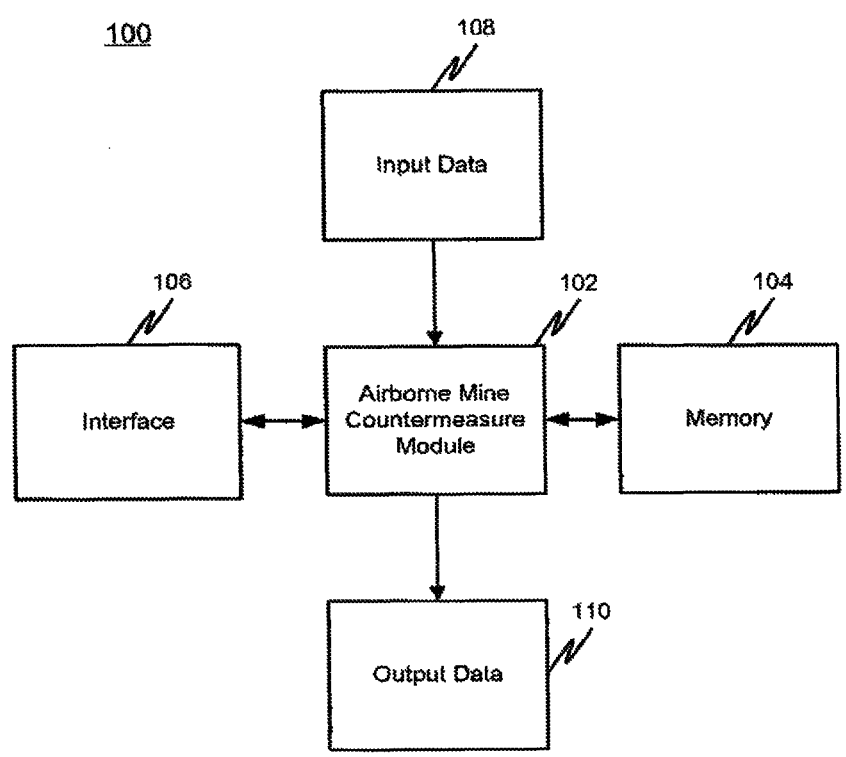
FIG. 1 is a diagram of an exemplary airborne mine countermeasure system in accordance with at least one embodiment.

FIG. 1 is a diagram of an exemplary airborne mine countermeasure system 100. In particular, the system 100 includes an airborne mine countermeasures (AMCM) unit 102 coupled to a memory 104 and an interface 106.

In operation, the AMCM module 102 receives input data 108 (e.g., image data) and processes the data according to a method for AMCM described below. The image data can be obtained, for instance, from an image sensor onboard an aircraft such as an airplane, unmanned aerial vehicle (UAV) or helicopter (see, e.g., FIG. 3, reference number 300). The AMCM module 102 can store a result of processing in the memory 104, and/or the AMCM module 102 can transmit the result data to one or more external systems via the interface 106. The result can be provided as output data 110 to another system, or sent to a display device or printer.

The output result can be an enhanced image showing potential underwater mines, which may not have been visible or as distinguishable in the input image.

The interface 106 can be a specialized bus onboard an aircraft or vehicle (e.g., 1553, CAN bus, or the like), or a wired or wireless network interface.

Figure 2:
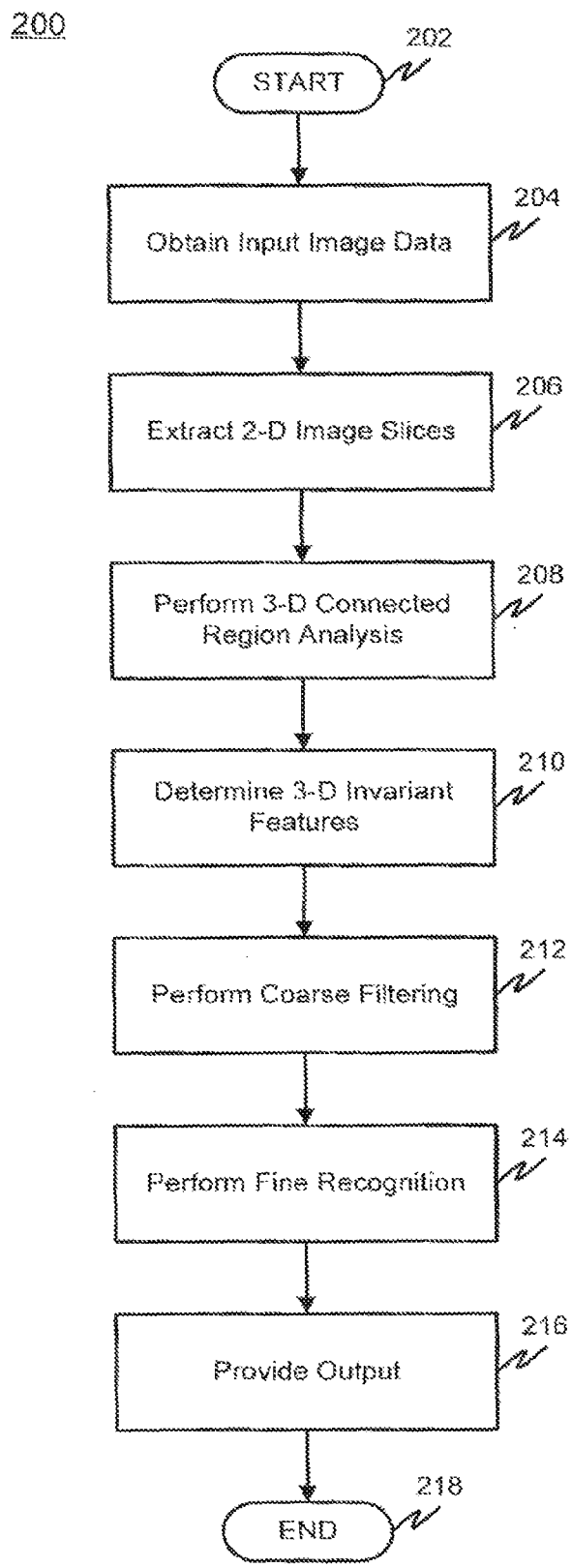
FIG. 2 is a chart showing an exemplary airborne mine countermeasure method in accordance with at least one embodiment.

FIG. 2 is a chart showing an exemplary airborne mine countermeasure method. Processing beings at 202 and continues to 204.

At 204, input data is received (e.g., image data). Processing continues to 206.

At 206, a series of 2-D slices are extracted from the input data. Diffusion equations can be used to extract the series of 2-D slices, for example, according to the following equations:

$$\frac{\partial u(x, y, t)}{\partial t} = \frac{\partial^2 u(x, y, t)}{\partial x^2} + \frac{\partial^2 u(x, y, t)}{\partial y^2}$$

where $u(x,y,0)=I(x,y)$(the Original Images).

With certain boundary condition, the solution is:

$$u(x, y, t) = cI(x, y) \otimes \exp\left(-\frac{(x^2 + y^2)}{2t}\right)$$

$$\frac{\partial u(x, t)}{\partial t} = \frac{\partial^2 u(x, t)}{\partial x^2}$$

and $$\frac{\partial u(x, t)}{\partial t} = \frac{\partial^2 u(x, t)}{\partial x^2}$$

where $u(x,0)=I(x)$(the Original Image).

With certain boundary condition, the solution is:

$$u(x, t) = cI(x, y) \otimes \exp\left(-\frac{(x^2)}{2t}\right)$$

The diffusion equation approach described above can permit a system to extract different size objects through a series of band-pass-like filtering operations. The diffusion equation technique is described in "Repeatedly smoothing, discrete scale-space evolution, and dominant point detection," by Bing C. Li, Pattern Recognition, Vol. 29, No. 6, 1996, which is incorporated herein by reference. It will be appreciated that techniques other than diffusion equations can be used. By extracting 2-D slices, image processing time can be improved. Processing continues to 208.

At 208, a 3-D connected region analysis is performed. The 3-D connected region analysis can be performed, for example, using voxels (or volumetric pixel elements). The 3-D connected region analysis can help reduce false positives. Processing continues to 210.

At 210, 3-D invariant feature in the image data are extracted. 3-D invariant features are those features that do not substantially change with respect to an aspect of an object such as size, orientation or other feature of that object in an image. The 3-D invariant features can include invariant moments, which are weighted averages (i.e., moments) of image pixel intensities, or a function of such moments. Invariant moments are typically chosen to have some attractive property, such as size or orientation invariance. It is possible to calculate moments that are invariant to translation, scale (or size) and/or rotation, for example the Hu set of invariant moments is a common set of invariant moments that can be used to extract invariant features. It will be appreciated that other invariant moments can be used.

A 3-D orientation invariant feature is a feature that can be extracted from an object in an image and is substantially the same regardless of the orientation of the object being imaged. A 3-D orientation invariant feature could be used, for example, to identify an underwater mine regardless of the orientation of the mine when it was imaged. A size invariant feature could be used to identify an object regardless of the apparent size of the object in the image. Object image sizes, even of the same object, can appear different for a number of reasons such as distance from the object to the image sensor and the optics being used, for example. The 3-D invariant features can be size and/or orientation invariant features. By converting the pixel data to representative invariant features, the specific location, size and orientation of an object are replaced with invariant features that can be compared to a reference catalog of invariant features of objects of interest (e.g., different types of underwater mines). Thus, the invariant features permit a processor to recognize a 3-D object in the image data regardless of its orientation, location or scale in the image.

The invariant features can include global or local invariants and can be based on 3-D moment invariants. Processing continues to 212.

At 212, coarse filtering is performed. The coarse filtering can include computing a distance of invariant features in input image data to invariant features in a feature catalog. The feature catalog can be based on training data (see FIG. 4 and corresponding description below for more details). The distance can be a Euclidean distance, and the filtering can including labeling objects in the input image data according to the K nearest neighbors of those objects in the feature catalog data. An output of the coarse filtering can include providing a list of the objects in the input image that most closely match one or more objects in the feature catalog. The coarse filtering based on invariant features can help speed up the image processing. Processing continues to 214.

At 214, fine object recognition is performed. The fine object recognition can be performed on the image data using a method with a metric, such as a Hausdorff metric. The fine object recognition can focus on the list of objects supplied by the coarse filtering step (212) and can be used to help achieve a low false positive rate. An output of the fine filtering process can include a list of those objects that have been further determined to match the features of objects in the catalog (e.g., those objects that appear to match one or more underwater mine types). Processing continues to 216.

At 216, a result of the mine countermeasure processing can be provided. The result can be displayed on a display device, sent to a printing device or transmitted to an external system via a wired or wireless network. Processing continues to 218, when processing ends.

It will be appreciated that 204-216 may be repeated in whole or in part in order to accomplish a contemplated airborne mine countermeasure task.

Figure 3:
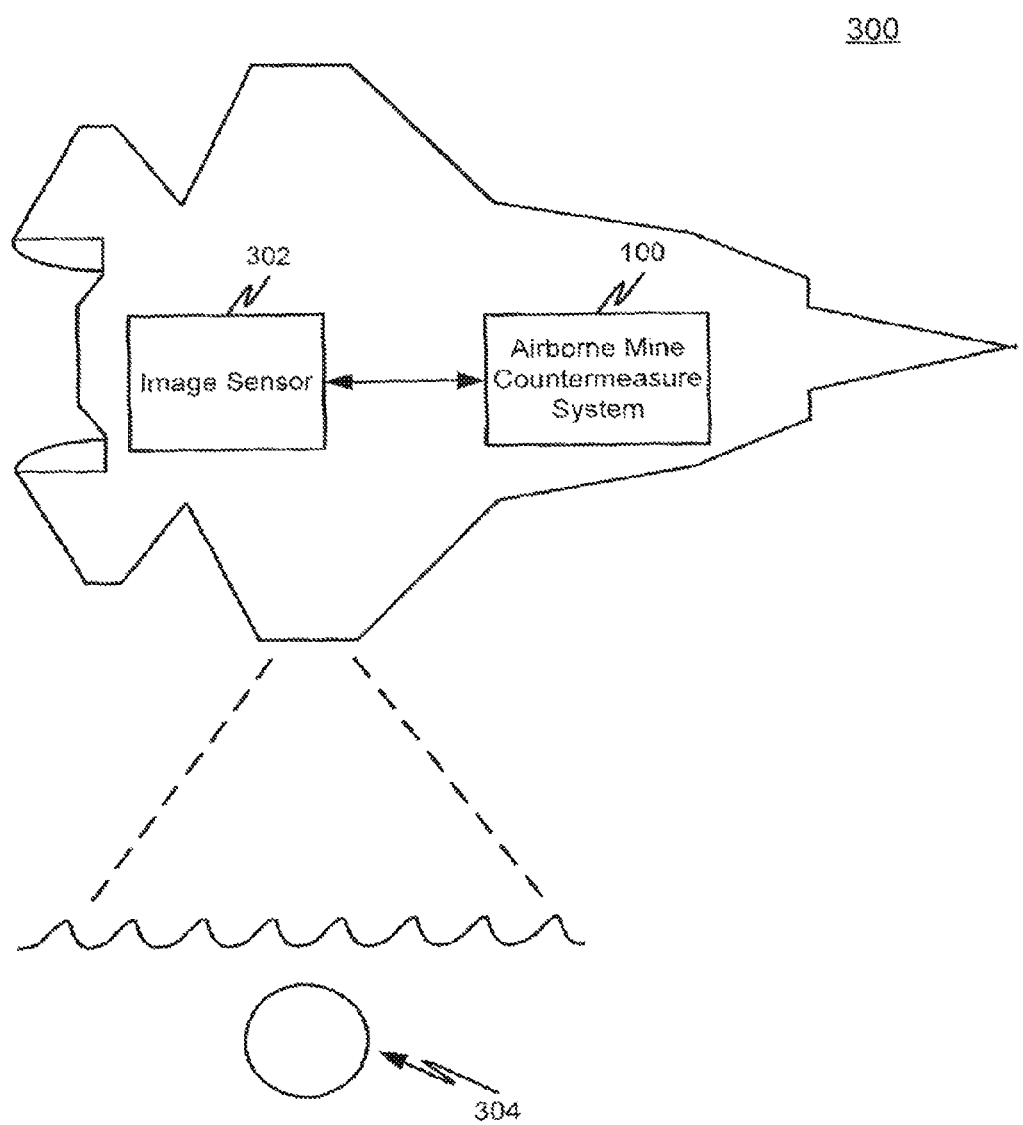
FIG. 3 is a diagram of an exemplary aircraft having an airborne mine countermeasure system in accordance with at least one embodiment.

FIG. 3 is a diagram of an exemplary aircraft 300 having an airborne mine countermeasure system 100 in accordance with the present disclosure. The airborne mine countermeasure system 100 is coupled to an image sensor 302 that is adapted to take images of a body of water in order to detect an underwater mine 304. The aircraft 300 can be a fixed wing or rotary wing aircraft. Also, the aircraft 300 can be a manned aircraft or unmanned aerial vehicle (UAV).

In operation, the aircraft 300 uses an image sensor 302 to take images of a body of water in order to detect an underwater mine 304. The airborne mine countermeasure system 100 is adapted to receive images from the image sensor 302 and process the images, as described above, in order to detect an underwater mine 304. The processing can include providing an enhanced output display that indicates the presence of objects that are potentially underwater mines.

Figure 4:
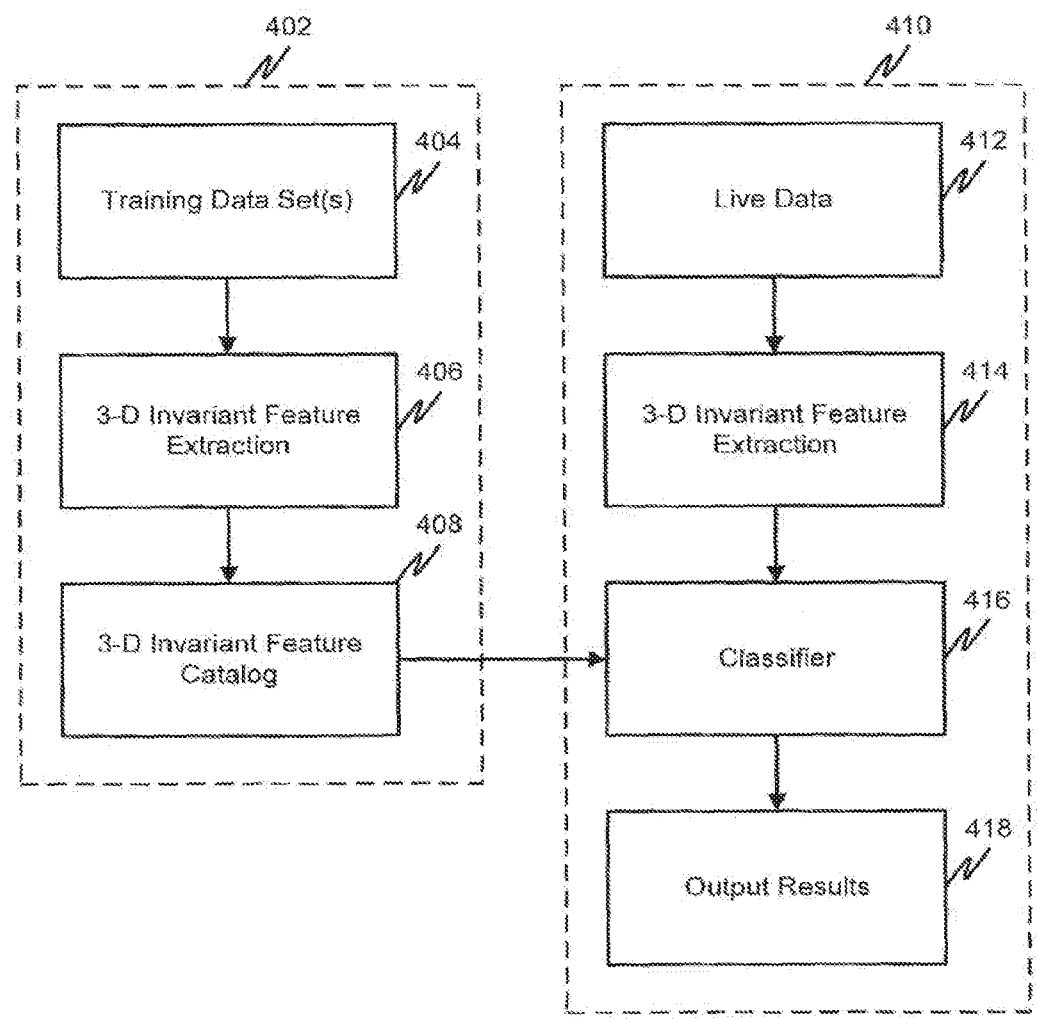
FIG. 4 is a diagram of an exemplary 3-D invariant feature extraction and classification in accordance with at least one embodiment.

FIG. 4 is a diagram of an exemplary 3-D invariant feature extraction and classification system 400. The system 400 includes a training sub-system 402 having one or more training data sets 404, a 3-D invariant feature extraction module 406 and a 3-D invariant feature catalog 408.

The system 400 also includes a "live" data processing sub-system 410 having live data 412, a 3-D invariant feature extraction module 414, a classifier 416 and output result data 418. The live data being data collected during operation of the system and not intended for primary use as training data. Live data is not limited to data being captured and processed in real time, and can include operational image data captured and stored for later analysis.

In operation, a first phase includes extracting 3-D invariant features from the training data 404. The invariant features can include moment invariant features. Also, the features can be size invariant and/or orientation invariants. The training data 404 can include images of one or more known objects, such as underwater mines. The training data 404 can include image data of a real object or data having a computer generated image of an object. The process of extracting the 3-D invariant features can be supervised, semi-supervised and/or unsupervised.

The extracted 3-D invariant features can be cataloged and stored in a data store for later access. The cataloging process can be automatic, manual or a combination of the above.

The catalog of 3-D invariant features 408 can be updated to include invariant features of new objects (e.g., new types of underwater mines).

Once the catalog of 3-D invariant features 408 is generated, it can be supplied to a system (e.g., an airborne mine countermeasure system) for use on live data.

The live data processing sub-system 410 takes in live image data 412 captured by an image capture device and supplies the live image data 412 as input to a 3-D invariant feature extraction module 414. The 3-D invariant feature extraction module 414 can be the same as (or different from) the 3-D invariant feature extraction module 406 in the training subsystem 402.

The 3-D invariant feature extraction module 414 extracts one or more features from the live image data 412 and provides those features to the classifier 416. The classifier 416 determines how close the extracted features of the live image data match the features of one or more objects in the catalog. The classifier can use any suitable technique such as a neural network, K nearest neighbors, or a supervised (e.g., support vector machine or the like) or unsupervised machine learning technique. The classifier 416 can perform the coarse filtering function described above.

The output 418 of the classifier 416 can include a list of objects from the live image data and an indication of how close features of those objects match features in the feature catalog 408.

The output results 418 can be used to determine if one or more of the objects in the live image data 412 appear to be an object of interest (e.g., an underwater mine). Any objects of interest can be provided to a module for fine object recognition to further determine with greater accuracy or certainty that an object in an image is an object of interest.

It will be appreciated that the modules, processes, systems, and sections described above can be implemented in hardware, hardware programmed by software, software instructions stored on a nontransitory computer readable medium or a combination of the above. A system for airborne mine countermeasures, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and/or image processing arts.

Moreover, embodiments of the disclosed method, system, and computer program product can be implemented in software executed on a programmed general purpose computer, a special purpose computer, a microprocessor, or the like.

It is, therefore, apparent that there is provided, in accordance with the various embodiments disclosed herein, computer systems, methods and computer readable media for airborne mine countermeasures.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. An object detection system comprising:
   an image sensor configured to obtain input image data of a body of water;
   a processor for executing modules;
   a memory containing the modules, the executed modules including:
   an image slice extraction module configured to extract a sequence of 2-D slices from the input image data;
   a 3-D analysis module configured to perform a 3-D connected region analysis on the sequence of 2-D slices;
   an invariant feature computation module configured to compute image 3-D invariant features in the input image data;
   an image filter module configured to perform coarse filtering based on the image 3-D invariant features, the coarse filtering including comparing the image 3-D invariant features in the input image data to a data store of trained 3-D invariant features associated with known objects; and
   an image recognition module configured to perform fine recognition to identify at least one of the known objects from the data store within the input image data.

2. The system of claim 1, further comprising:
   an object training module configured to extract training 3-D invariant features of the known objects in training data, and store the training 3-D invariant features as the trained 3-D invariant features and the known objects in the data store.

3. The system of claim 1, wherein performing the fine recognition includes applying a metric including a Hausdorff metric.

4. The system of claim 1, wherein the image slice extraction module is further configured to apply diffusion equations to generate the sequence of 2-D slices.

5. The system of claim 1, wherein the image 3-D invariant features include moment invariants.

6. The system of claim 1, wherein the image sensor is located on an aircraft.

7. The system of claim 6, wherein the aircraft is a helicopter, fixed wing aircraft, or unmanned aerial vehicle.

8. A computerized method for detecting objects, comprising:
   obtaining, at a processor, input image data of a body of water from an image sensor;
   extracting, using the processor, a sequence of 2-D slices from the input image data;
   performing a 3-D connected region analysis, using the processor, on the sequence of 2-D slices;
   determining, using the processor, image 3-D invariant features in the input image data;
   performing, using the processor, coarse filtering based on the image 3-D invariant features, the coarse filtering including comparing the image 3-D invariant features in the input image data to a data store of trained 3-D invariant features associated with known objects; and
   performing fine recognition to identify at least one of the known objects from the data store within the input image data.

9. The method of claim 8, further comprising:
   training the data store, the training comprising
   extracting training 3-D invariant features of the known objects in training data; and
   storing the training 3-D invariant features as the trained 3-D invariant features and the known objects in the data store.

10. The method of claim 8, wherein performing the fine recognition includes applying a metric including a Hausdorff metric.

11. The method of claim 8, wherein the extracting includes using diffusion equations to generate the sequence of 2-D slices.

12. The method of claim 8, wherein the image 3-D invariant features include moment invariants.

13. The method of claim 8, wherein performing the 3-D connected region analysis includes analyzing, at the processor, volumetric pixel elements.

14. A nontransitory computer readable medium having stored thereon instructions that, when executed by a processor, cause the processor to perform a series of operations to detect objects, the detecting including:
   obtaining, at a processor, input image data of a body of water from an image sensor;
   extracting, using the processor, a sequence of 2-D slices from the input image data;
   performing a 3-D connected region analysis, using the processor, on the sequence of 2-D slices;
   determining, using the processor, image 3-D invariant features of at least one object in the input image data;
   performing, using the processor, coarse filtering based on the image 3-D invariant features, the coarse filtering including comparing the image 3-D invariant features of the at least one object to a data store of trained 3-D invariant features associated with known objects; and
   performing fine recognition to determine if the at least one object in the input image data corresponds to one of the known objects.

15. The nontransitory computer readable medium of claim 14, wherein the detecting further includes:
   training the data store, the training comprising:
   extracting training 3-D invariant features of the known objects in training data; and
   storing the training 3-D invariant features as the trained 3-D invariant features and the known objects in the data store.

16. The nontransitory computer readable medium of claim 14, wherein performing the fine recognition includes applying a metric including a Hausdorff metric.

17. The nontransitory computer readable medium of claim 14, wherein the extracting includes using diffusion equations to generate the sequence of 2-D slices.

18. The nontransitory computer readable medium of claim 14, wherein the image 3-D invariant features include moment invariants.

19. The nontransitory computer readable medium of claim 14, wherein performing the 3-D connected region analysis includes analyzing, at the processor, volumetric pixel elements.

20. The nontransitory computer readable medium of claim 14, wherein the extracting includes extracting different size objects through a series of filtering operations.

* * * * *